United States Patent
Saruwatari (10) Patent No.: US 7,864,444 B2
(45) Date of Patent: Jan. 4, 2011

(54) ZOOM LENS AND IMAGE PICKUP APPARATUS INCLUDING THE SAME

(75) Inventor: Hiroshi Saruwatari, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 12/420,552

(22) Filed: Apr. 8, 2009

(65) Prior Publication Data

US 2009/0251797 A1 Oct. 8, 2009

(30) Foreign Application Priority Data

Apr. 8, 2008 (JP) ............................. 2008-100135

(51) Int. Cl.
*G02B 9/34* (2006.01)
(52) U.S. Cl. ...................... 359/687; 359/774
(58) Field of Classification Search ............... 359/687, 359/774
See application file for complete search history.

(56) References Cited

U.S. PATENT DOCUMENTS

| 5,585,966 A | 12/1996 | Suzuki |
| 6,016,228 A | 1/2000 | Uzawa |
| 6,975,461 B2 | 12/2005 | Eguchi |
| 7,190,529 B2 * | 3/2007 | Miyajima et al. ........... 359/687 |
| 7,206,137 B2 | 4/2007 | Nakatani et al. |

* cited by examiner

*Primary Examiner*—Joseph Martinez
(74) *Attorney, Agent, or Firm*—Canon USA Inc IP Div (57) ABSTRACT

Provided is a zoom lens having a high magnification and excellent optical performance over an entire zoom range between a wide-angle end and a telephoto end. The zoom lens includes, in order from object side to image side: a first lens unit having positive refractive power; a second lens unit having negative refractive power; a third lens unit having positive refractive power; and a fourth lens unit having positive refractive power, and performs zooming while the respective lens units move, in which: during zooming from wide-angle end to telephoto end, the first unit moves closer to object side at telephoto end than at wide-angle end and the fourth unit moves along a locus convex to object side; and a focal length of the second unit, a focal length of the zoom lens at wide-angle end, and an imaging magnification of the fourth unit at telephoto end are appropriately set.

15 Claims, 9 Drawing Sheets

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens, and is suitable for use in, for example, a video camera, an electronic still camera, a TV camera (broadcasting camera), and a silver-halide film camera.

2. Description of the Related Art

In recent years, an image pickup apparatus such as a video camera, a digital still camera, and a broadcasting camera which use a solid-state image pickup element, or a camera using a silver-halide film is improved in function, and the entire image pickup apparatus is reduced in size. A zoom lens which has a short total lens length, is compact, and has high resolution is desired as an optical system used for the image pickup apparatus.

In order to reduce a size of the zoom lens, the number of lenses is desirably reduced while a refractive power of each of lens units included in the zoom lens is increased. However, a lens thickness increases along with the increase in refractive power of each surface, with the result that the length of the entire lens system cannot be sufficiently reduced and it makes it difficult to correct various aberrations.

When the respective lens units are to be collapsed in a case where a camera is not used, errors such as the tilt of lenses or lens units become inevitably larger because of mechanical structure. In such case, when the sensitivity of lenses or lens units is excessively large, the degradation of optical performance or image fluctuation during zooming occurs. Therefore, it is desirable to minimize the sensitivity of lenses or lens units in the zoom lens.

In a rear focus zoom lens in which lens units other than a first lens unit located on the object side are moved for focusing, an effective diameter of the first lens unit can be reduced compared with the case where the first lens unit is moved for focusing, and hence the entire lens system is easily reduced in size. The lens units which are small in size and light in weight are moved for focusing, and hence the driving power of the lens units is small, with the result that focusing can be speedily performed.

There has been known, as the rear focus zoom lens, a zoom lens which is suitable for a retractable structure and includes four lens units, that is, a first lens unit having a positive refractive power, a second lens unit having a negative refractive power, a third lens unit having a positive refractive power, and a fourth lens unit having a positive refractive power, which are provided in order from the object side to the image side.

U.S. Pat. No. 6,016,228 discloses a zoom lens having a zoom ratio of approximately 3. The first lens unit is constituted by a single lens. Intervals between the respective lens units are adjusted for zooming. The fourth lens unit is moved for focusing. The zoom lens is suitable for a retractable structure because the sensitivity of the first lens unit or the second lens unit is relatively small. However, the first lens unit is not moved during zooming, and hence it is difficult to shorten a total lens length at the wide-angle end and reduce the diameter of a front lens.

U.S. Pat. No. 6,975,461 discloses a zoom lens including respective lens units to be moved for zooming and having a zoom ratio of approximately 5. In the zoom lens, a share of the third lens unit in magnification is suitably set, whereby the zoom lens having a zoom ratio of approximately 5 is realized.

In order to further increase the magnification of the zoom lens, it is necessary to suitably set a share in magnification between the second lens unit and the third lens unit.

U.S. Pat. No. 7,206,137 and U.S. Pat. No. 7,190,529 disclose a zoom lens including respective lens units to be moved for zooming and having a zoom ratio equal to or larger than 10.

In the zoom lens disclosed in U.S. Pat. No. 7,206,137, a focal length of the first lens unit is suitably set to achieve a balance between a reduction in size of the entire system and correction of various aberrations. However, a moving distance of the first lens unit during zooming is large, and hence a multi-step lens barrel structure is required in order to shorten a length in a collapsed state.

In a zoom lens disclosed in U.S. Pat. No. 7,190,529, a change in lateral magnification of the second lens unit during zooming is equal to or smaller than 15, and hence it is difficult to increase the magnification.

In the lens constitution disclosed in each of U.S. Pat. Nos. 7,206,137 and 7,190,529, in order to further increase the magnification, it is necessary to increase a share of the fourth lens unit in magnification. However, when the imaging magnification of the fourth lens unit is increased at the telephoto end, focal moving distance when the fourth lens unit is moved in the optical axis direction becomes smaller. Therefore, when a focal variation caused by a change in temperature or a tolerance in parts is to be corrected using the fourth lens unit, the amount of driving becomes larger. This is not desirable.

On the other hand, when the imaging magnification of the fourth lens unit is reduced, the share of the fourth lens unit in magnification becomes smaller, and the refractive powers of the other lens units and the moving distance thereof during zooming necessarily increase. Therefore, it is difficult to ensure high optical performance while a compact lens barrel having the retractable structure is provided.

There has also been known a zoom lens in which lens unit(s) constituting the zoom lens is (are) displaced in a direction perpendicular to the optical axis to correct a blurred image caused when the zoom lens vibrates (U.S. Pat. No. 5,585,966). The zoom lens includes four lens units, that is, a first lens unit having a positive refractive power, a second lens unit having a negative refractive power, a third lens unit having a positive refractive power, and a fourth lens unit having a positive refractive power, which are provided in order from the object side to the image side. The entire third lens unit is vibrated in the direction perpendicular to the optical axis to correct the blurred image.

In the zoom lens including the four lens units, in order to obtain excellent optical performance while a high zoom ratio is realized and the entire lens system is reduced in size, it is important to suitably set refractive indices and lens constitution of the respective lens units and movement conditions of the respective lens units in the case of zooming.

In particular, it is important to suitably set the movement conditions of the respective lens units in the case of zooming, the refractive power of the second lens unit (reciprocal of focal length), and the imaging magnification of the fourth lens unit.

When such configurations are not suitably set, it is very difficult to obtain a zoom lens which has high optical performance over the entire zoom range and is suitable for the retractable structure, while a high zoom ratio is ensured.

SUMMARY OF THE INVENTION

A zoom lens according to the present invention comprises, in order from an object side to an image side: a first lens unit having a positive refractive power; a second lens unit having a negative refractive power; a third lens unit having a positive refractive power; and a fourth lens unit having a positive refractive power, and performs zooming while the first lens unit, the second lens unit, the third lens unit, and the fourth lens unit are moved. In the zoom lens, during zooming from a wide-angle end to a telephoto end, the first lens unit moves to be located closer to the object side at the telephoto end than at the wide-angle end and the fourth lens unit moves along a locus convex to the object side, and the following conditions are satisfied:

$-2.5 < f2/fw < -1.8$; and $0.49 < 1-\beta 4t^2 < 0.80$, where f2 is a focal length of the second lens unit, fw is a focal length of the zoom lens at the wide-angle end, and β4t is an imaging magnification of the fourth lens unit at the telephoto end.

According to the present invention, a small zoom lens, which achieves a high magnification and has excellent optical performance over the entire zoom range between the wide-angle end and the telephoto end, is obtained.

Further features of the present invention become apparent from the following description of exemplary embodiments with reference to the attached drawings.

DESCRIPTION OF THE EMBODIMENTS

Hereinafter, a zoom lens according to each of Embodiments of the present invention and an image pickup apparatus including the zoom lens are described.

The zoom lens according to the present invention includes a first lens unit having a positive refractive power, a second lens unit having a negative refractive power, a third lens unit having a positive refractive power, and a fourth lens unit having a positive refractive power, which are provided in order from the object side to the image side.

The respective lens units are moved for zooming. In particular, during zooming from the wide-angle end to the telephoto end, the first lens unit moves to be located closer to the object side at the telephoto end than at the wide-angle end, and the fourth lens unit moves along a locus convex to the object side.

Figure 1:
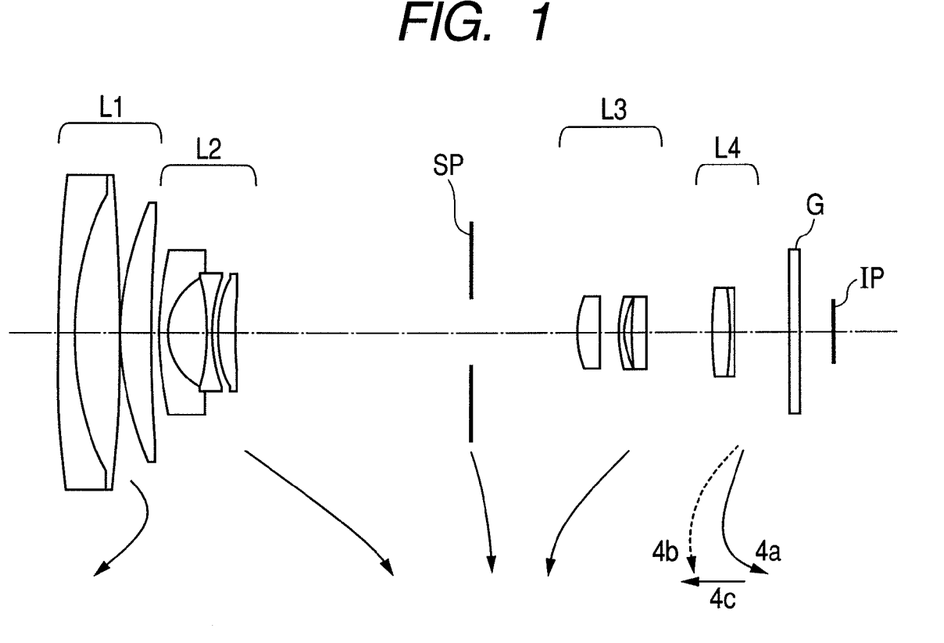
FIG. 1 is a cross sectional view illustrating a zoom lens according to Embodiment 1 of the present invention at a wide-angle end.
Figure 2A:
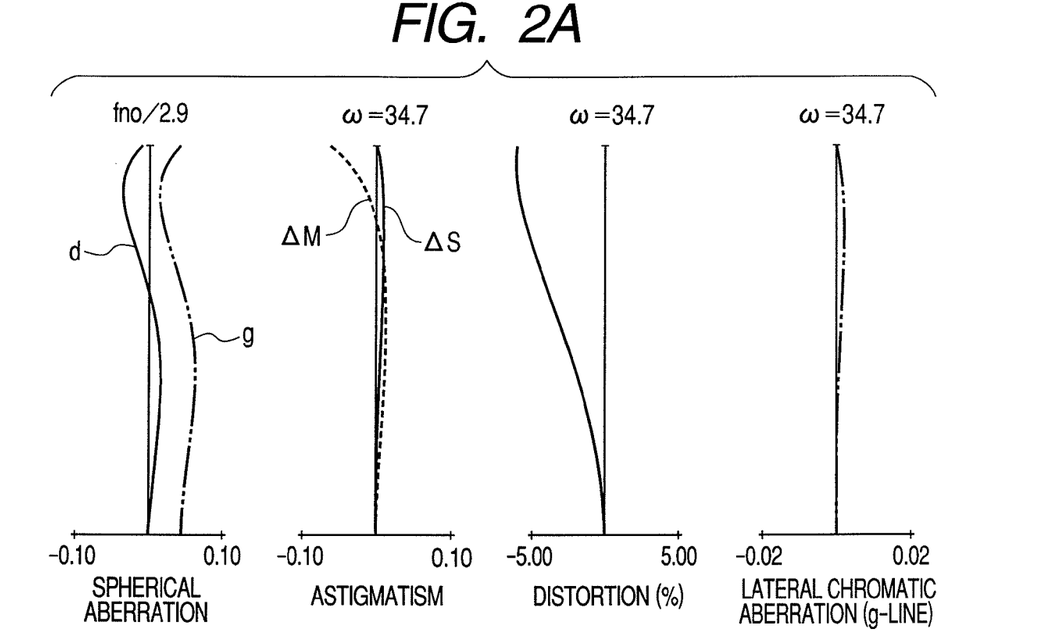
FIGS. 2A and 2B are aberration charts in Numerical Embodiment 1 corresponding to Embodiment 1 of the present invention.
Figure 2B:
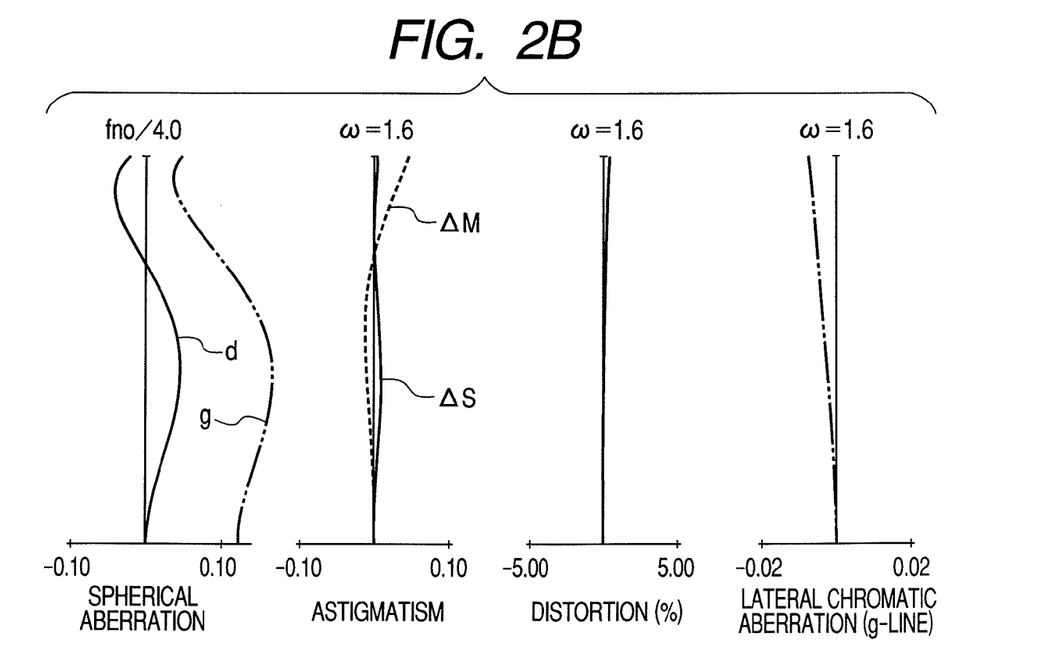

FIG. 1 is a cross sectional view illustrating a zoom lens according to Embodiment 1 of the present invention at the wide-angle end (short focal length end). FIGS. 2A and 2B are aberration charts of the zoom lens according to Embodiment 1 at the wide-angle end and the telephoto end (long focal length end).

Figure 3:
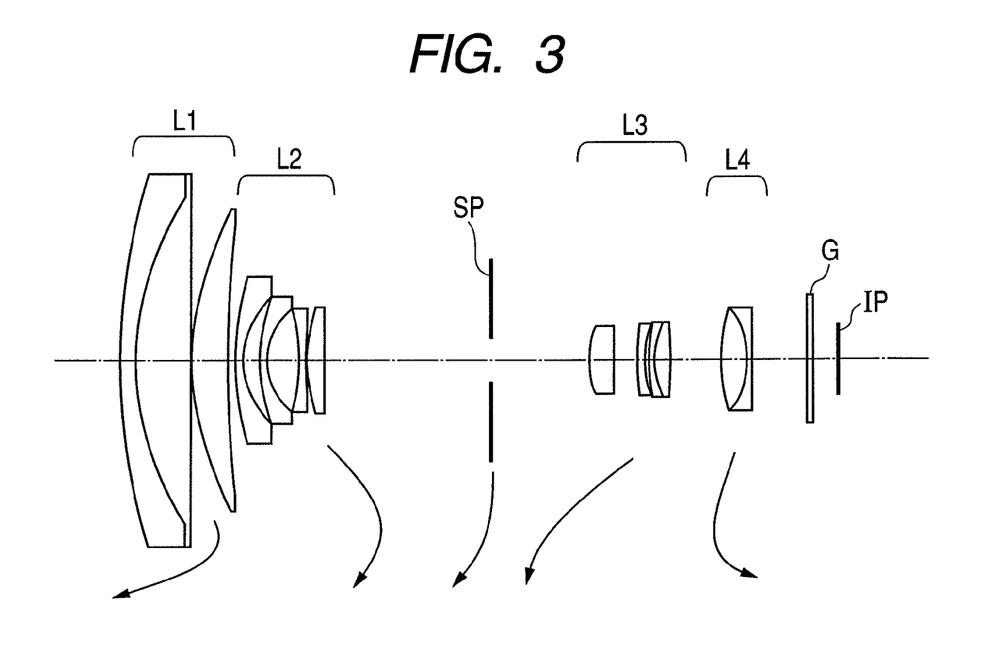
FIG. 3 is a cross sectional view illustrating a zoom lens according to Embodiment 2 of the present invention at a wide-angle end.
Figure 4A:
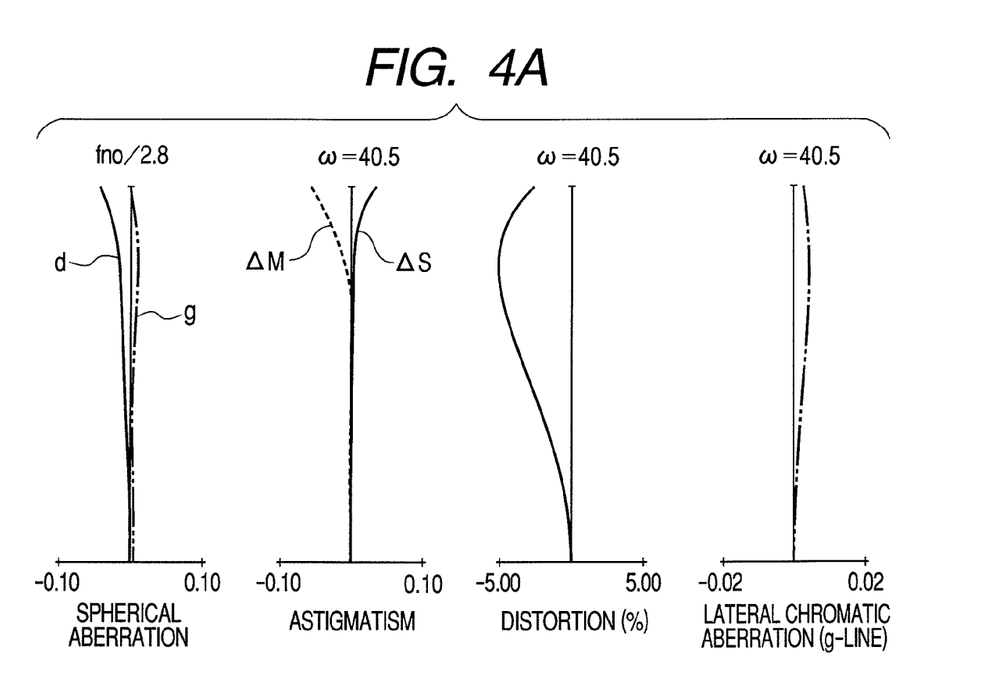
FIGS. 4A and 4B are aberration charts in Numerical Embodiment 2 corresponding to Embodiment 2 of the present invention.
Figure 4B:
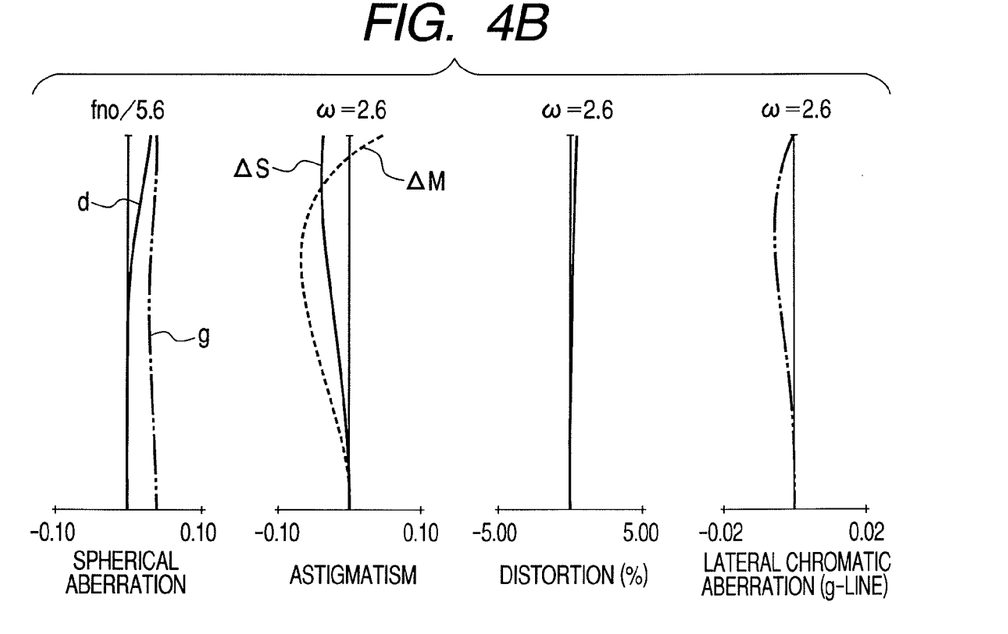
Figure 5:
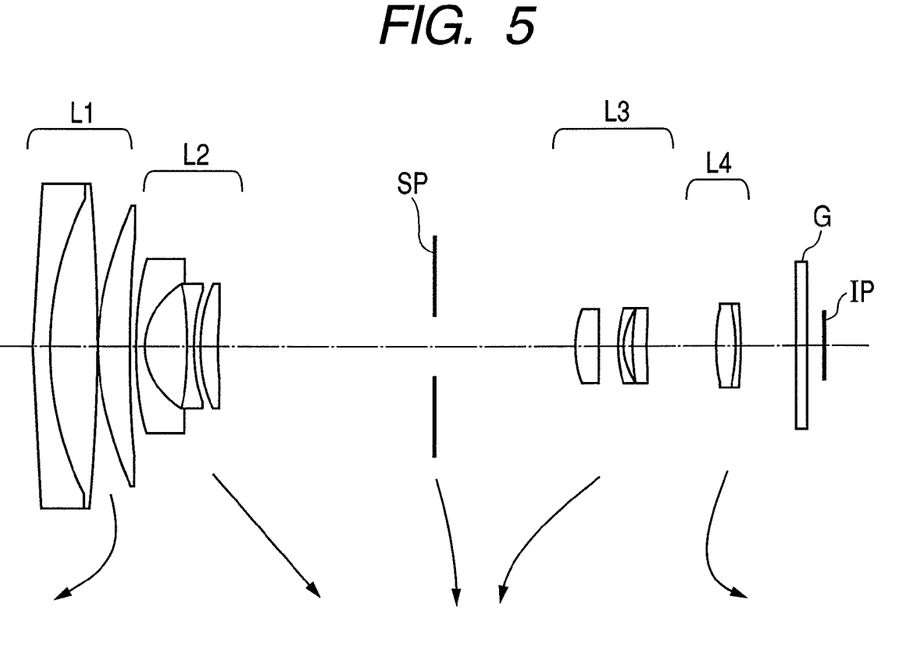
FIG. 5 is a cross sectional view illustrating a zoom lens according to Embodiment 3 of the present invention at the wide-angle end.
Figure 6A:
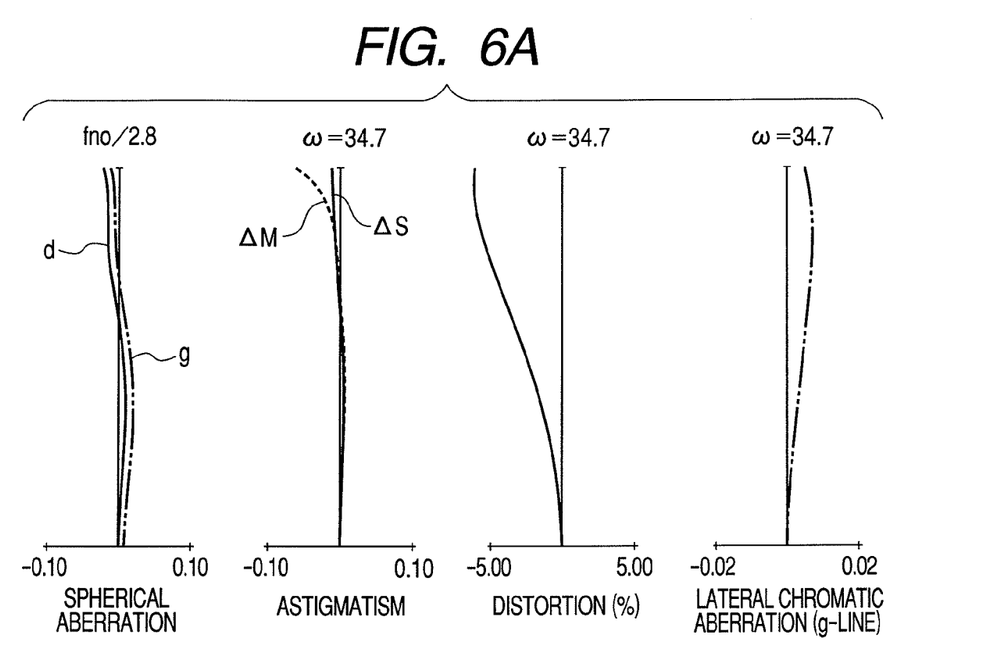
FIGS. 6A and 6B are aberration charts in Numerical Embodiment 3 corresponding to Embodiment 3 of the present invention.
Figure 6B:
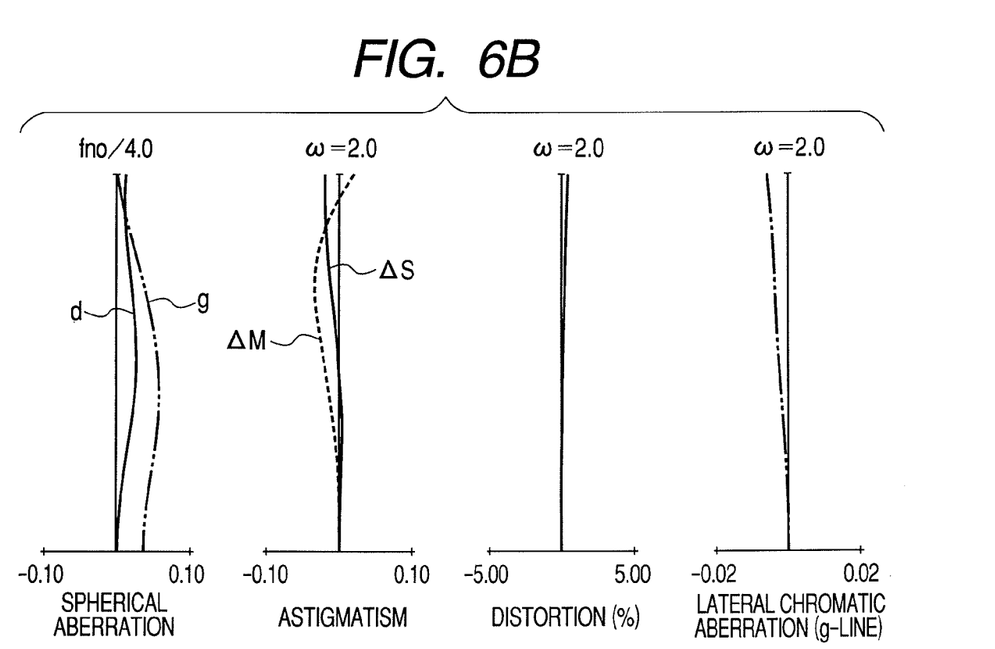
Figure 7:
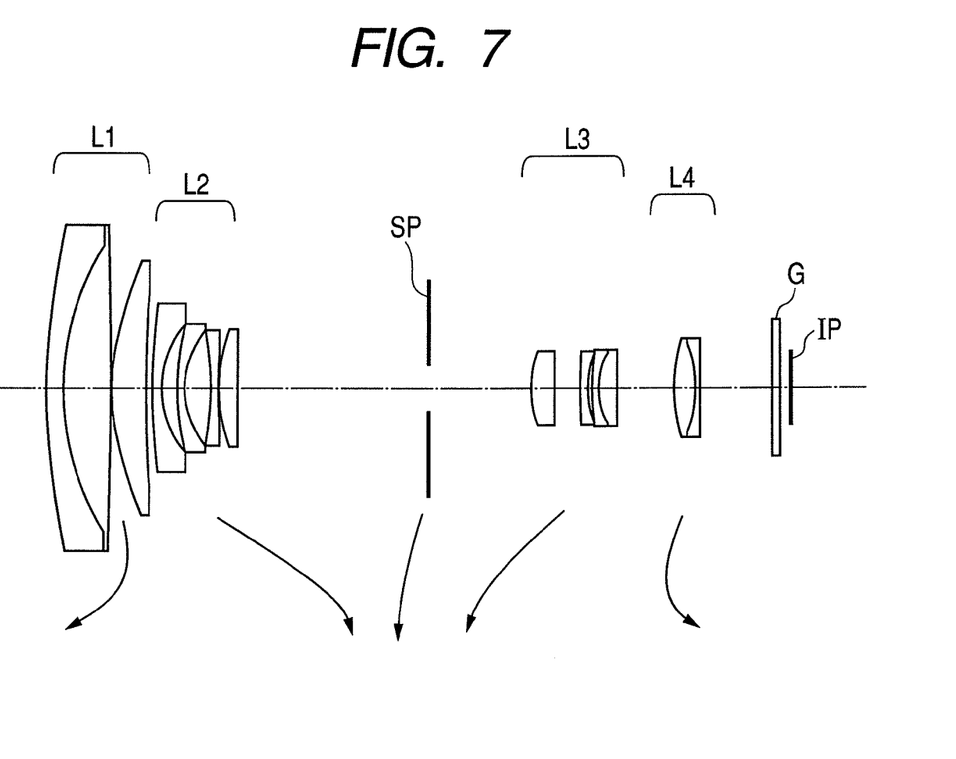
FIG. 7 is a cross sectional view illustrating a zoom lens according to Embodiment 4 of the present invention at the wide-angle end.
Figure 8A:
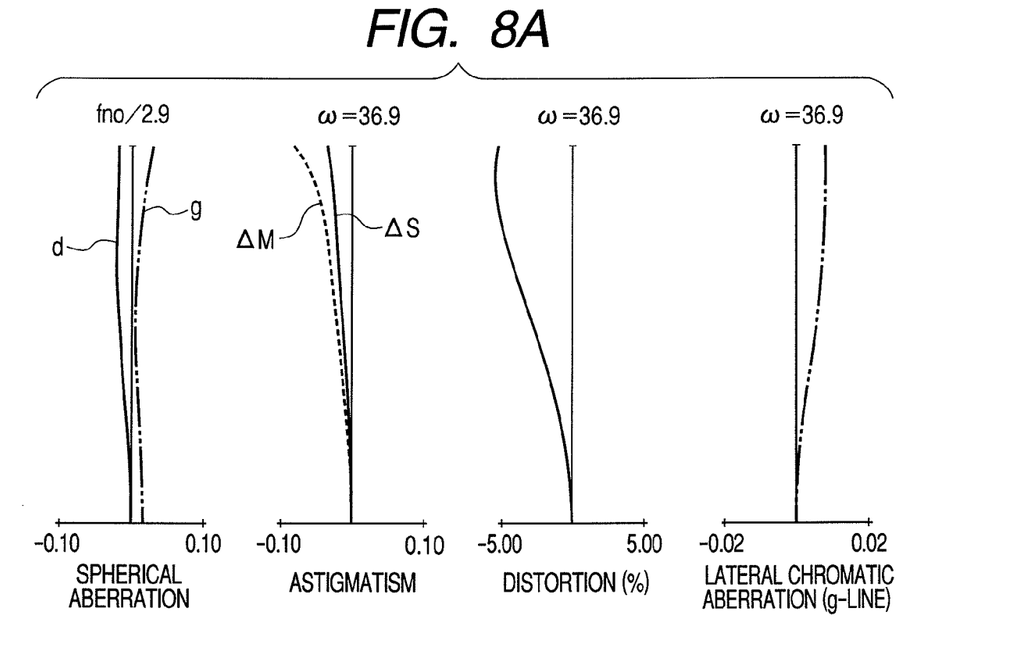
FIGS. 8A and 8B are aberration charts in Numerical Embodiment 4 corresponding to Embodiment 4 of the present invention.
Figure 8B:
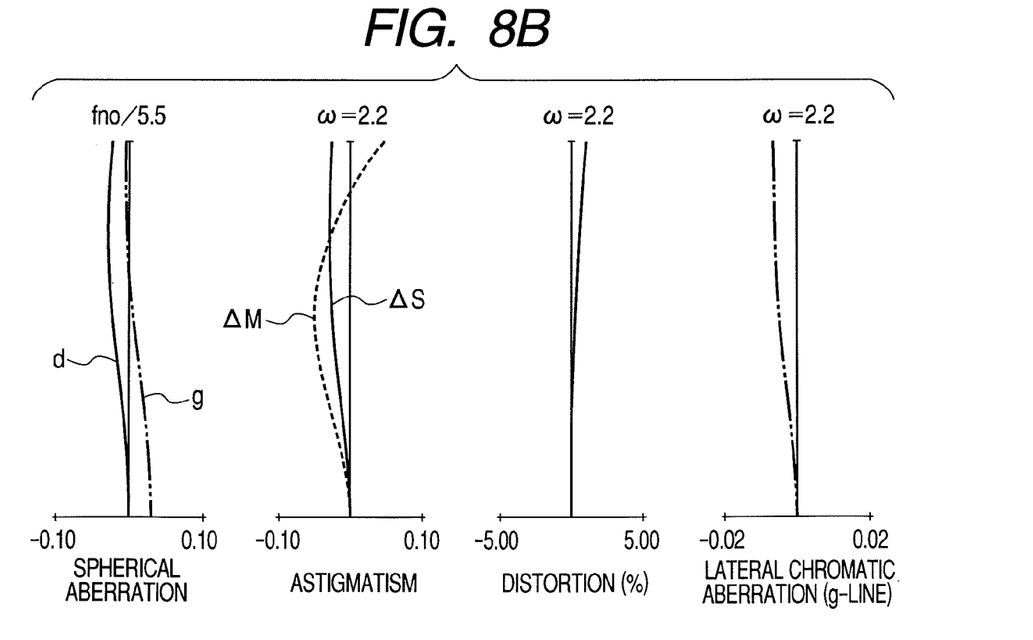

FIG. 3 is a cross sectional view illustrating a zoom lens according to Embodiment 2 of the present invention at the wide-angle end. FIGS. 4A and 4B are aberration charts of the zoom lens according to Embodiment 2 at the wide-angle end and the telephoto end. FIG. 5 is a cross sectional view illustrating a zoom lens according to Embodiment 3 of the present invention at the wide-angle end. FIGS. 6A and 6B are aberration charts of the zoom lens according to Embodiment 3 at the wide-angle end and the telephoto end. FIG. 7 is a cross sectional view illustrating a zoom lens according to Embodiment 4 of the present invention at the wide-angle end. FIGS. 8A and 8B are aberration charts of the zoom lens according to Embodiment 4 at the wide-angle end and the telephoto end.

Figure 9:
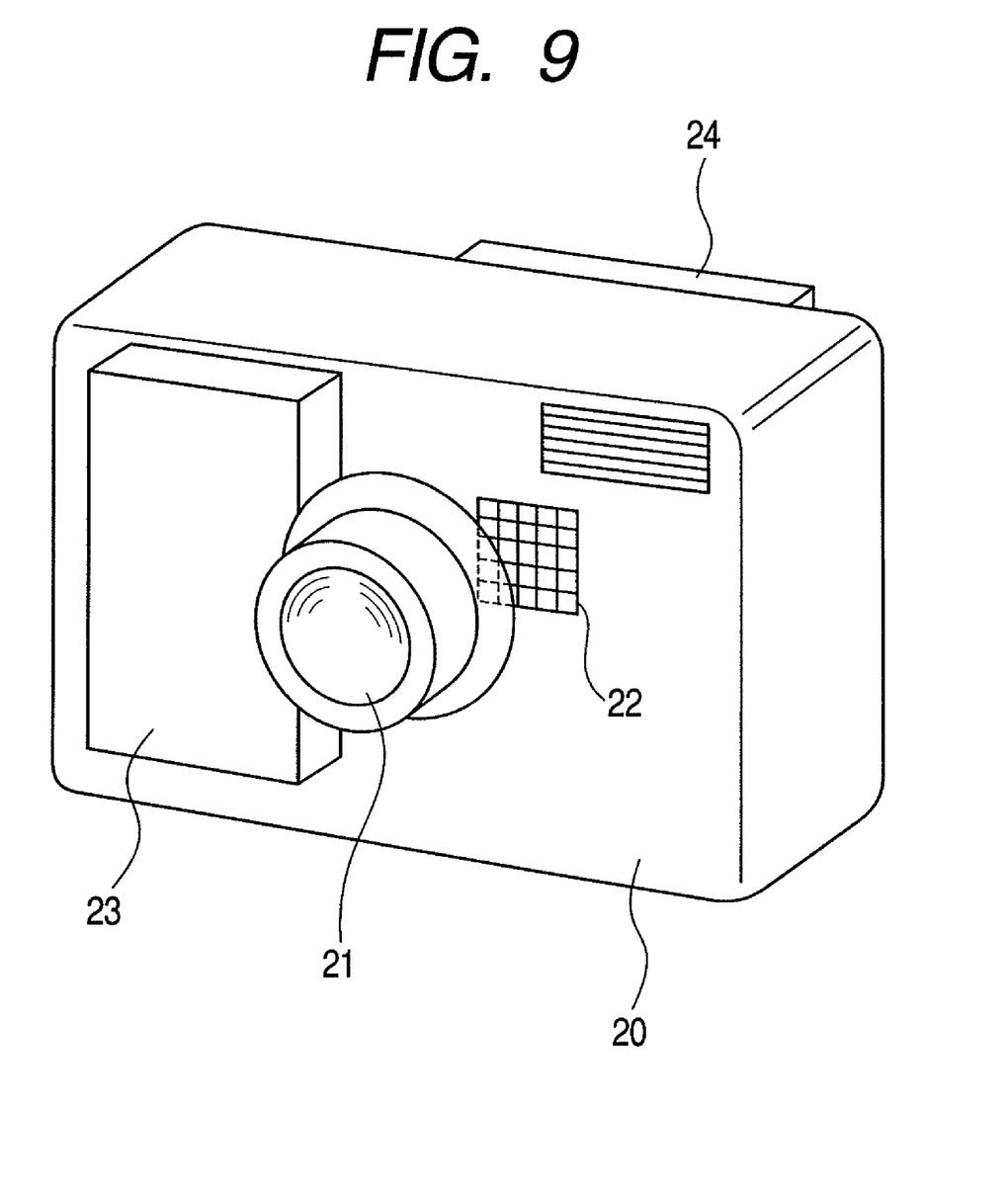
FIG. 9 is a schematic view illustrating an image pickup apparatus according to the present invention.

FIG. 9 is a schematic view illustrating a principal part of a camera (image pickup apparatus) including the zoom lens according to the present invention.

The zoom lens according to each of the Embodiments is a photography lens system used for an image pickup apparatus such as a video camera, a digital camera, or a silver-halide film camera. In each of FIGS. 1, 3, 5, and 7, the left side corresponds to the object side (front side) and the right side corresponds to the image side (rear side). In FIGS. 1, 3, 5, and 7, a lens unit's order counted from the object side is denoted by "i" and an i-th lens unit is denoted by L1.

In FIGS. 1, 3, 5, and 7, a first lens unit L1 has a positive refractive power ("optical power"="reciprocal of focal length"), a second lens unit L2 has a negative refractive power, a third lens unit L3 has a positive refractive power, and a fourth lens unit L4 has a positive refractive power.

An aperture stop SP is provided on the object side of the third lens unit L3.

An optical block G corresponds to an optical filter, a face plate, a quartz low-pass filter, an infrared cut filter, or the like.

An image plane IP is also provided. When the zoom lens according to the present invention is used as an image taking optical system of a video camera or a digital still camera, an image pickup surface of a solid-state image pickup element (photoelectric transducer) such as a CCD sensor or a CMOS sensor is set on the image plane IP. In a case of a silver halide film camera, a photosensitive surface corresponding to a film surface thereof is set on the image plane IP.

In the aberration charts, a d-line and a g-line are denoted by reference symbols d and g, respectively. A meridional image plane and a sagittal image plane are denoted by reference symbols ΔM and ΔS, respectively. Lateral chromatic aberration is illustrated with the g-line. A half field angle (half value of photography field angle) is denoted by reference symbol ω and an f-number is denoted by reference symbol fno.

In each of the following description of embodiments, the wide-angle end and the telephoto end correspond to the zoom positions when a magnification lens unit is located in each of both ends of a range in which the magnification lens unit is movable on the optical axis in terms of mechanisms.

In each of the Embodiments, as illustrated by arrows in FIGS. 1, 3, 5, and 7, the respective lens units are moved during zooming from the wide-angle end to the telephoto end.

Specifically, in each of the Embodiments, as illustrated by the arrows in FIGS. 1, 3, 5, and 7, the first lens unit L1 is moved along a locus convex to the image side during zooming from the wide-angle end to the telephoto end. In this case, the first lens unit L1 is moved to be located closer to the object side at the telephoto end than at the wide-angle end. The second lens unit L2 is moved toward the image side, the third lens unit L3 is moved toward the object side, and the fourth lens unit L4 is moved along a locus convex to the object side.

The first lens unit L1 and the third lens unit L3 are moved to be located closer to the object side at the telephoto end than at the wide-angle end during zooming, whereby a large zoom ratio is obtained while the total lens length at the wide-angle end is shortened.

In particular, in each of the Embodiments, the third lens unit L3 is moved toward the object side during zooming from the wide-angle end to the telephoto end, whereby the magnification effect is shared between the third lens unit L3 and the fourth lens unit L4. The first lens unit L1 having the positive refractive power is moved toward the object side within a zoom range, whereby the second lens unit L2 has a large magnification effect. Therefore, a high zoom ratio is obtained without significantly increasing the refractive powers of the first lens unit L1 and the second lens unit L2. The first lens unit L1 is moved along the locus convex to the image side during zooming, with the result that an interval between the first lens unit L1 and the aperture stop SP in the vicinity of the wide-angle end is shortened to reduce a front lens diameter.

A rear focus type is employed in which the fourth lens unit L4 is moved on the optical axis for focusing.

In a case of focusing from an infinitely distant object to a nearest object at the telephoto end, the fourth lens unit L4 is moved forward as illustrated by an arrow 4c. A solid-line curve 4a and a dashed-line curve 4b illustrate loci along which the fourth lens unit L4 moves for correcting an image plane variation caused by zooming from the wide-angle end to the telephoto end during focusing on the infinitely distant object and the nearest object, respectively.

In each of the Embodiments, the fourth lens unit L4 which is small in size and light in weight is moved for focusing, thereby achieving speedy focusing. For example, speedy auto-focusing is facilitated.

In each of the Embodiments, the third lens unit L3 is moved so as to have a component in a direction perpendicular to the optical axis to shift an image in the direction perpendicular to the optical axis, thereby correcting a blurred image when the entire optical system vibrates. That is, the position of a taken image is corrected.

Therefore, image stabilization is performed without providing an additional optical member such as a variable apex angle prism and an additional lens unit for image stabilization, thereby preventing the entire optical system from increasing in size.

In each of the Embodiments, the aperture stop SP moves independently from another lens unit, particularly, the third lens unit L3, during zooming. Therefore, an entrance pupil position in the vicinity of a wide-field angle region is set on the object side to reduce the front lens diameter.

For simplification of mechanisms, the aperture stop SP may move integrally with the third lens unit L3 or may be fixed. When the aperture stop SP moves integrally with the third lens unit L3, the number of units of optical component where the unit is defined in terms of their movement is small, and hence a mechanical structure is easily simplified.

When the aperture stop SP is fixed, the stop unit need not be moved. Therefore, during zooming, the driving torque of an actuator to be driven can be set to a small value, and hence there is an advantage that electric power can be saved.

In each of the Embodiments, the following conditions are satisfied:

$$-2.5 < f2/fw < -1.8 \quad (1)$$

$$0.49 < 1-\beta 4t^2 < 0.80 \quad (2)$$

where f2 is a focal length of the second lens unit L2, fw is a focal length of the zoom lens at the wide-angle end, and β4t is an imaging magnification of the fourth lens unit L4 at the telephoto end.

Conditional expressions (1) and (2) define the focal length of the second lens unit L2 and the imaging magnification of the fourth lens unit L4 which are related to the magnification.

When f2/fw exceeds the upper limit of Conditional Expression (1), the refractive power of the second lens unit L2 becomes excessively large and it is difficult to correct the image plane variation caused during zooming. When f2/fw is below the lower limit and thus the refractive power of the second lens unit L2 becomes excessively small, it is necessary to increase a moving distance of the second lens unit L2 during zooming in order to obtain a high magnification. As a result, the total lens length becomes longer to increase a lens barrel size. This is not desirable.

When $1-\beta 4t^2$ is below the lower limit of Conditional Expression (2), the amount of driving of the fourth lens unit L4 to correct a variation in focal position which is caused by tolerance in parts or a change in temperature during manufacturing of the respective lenses becomes larger when the correction is performed by driving the fourth lens unit L4 serving as a focus lens unit.

As a result, the aberration increases. This is not desirable. When $1-\beta 4t^2$ exceeds the upper limit, the share of the fourth lens unit L4 in magnification is excessively small, and hence it is difficult to achieve a high magnification.

In each of the Embodiments, in order to more desirably correct the aberration and to achieve a high magnification while the aberration during zooming is reduced, the numerical ranges of Conditional Expressions (1) and (2) are desirably set as follows.

$$-2.25 < f2/fw < -1.85 \quad (1a)$$

$$0.49 < 1-\beta 4t^2 < 0.70 \quad (2a)$$

According to the respective Embodiments, when Conditional Expressions (1) and (2) are satisfied as described above, it is possible to obtain a small zoom lens which achieves a high zoom ratio and has high optical performance over the entire zoom range.

In the present invention, at least one of the following various conditions is more desirably satisfied:

$$4.0 < f3/fw < 6.0 \quad (3);$$

$$4.5 < f4/fw < 8.0 \quad (4);$$

$$10 < f1/fw < 25 \quad (5); \text{ and}$$

$$1.2 < m1/m3 < 3.0 \quad (6);$$

where f1, f3, and f4 represent focal lengths of the first lens unit L1, the third lens unit L3 and the fourth lens unit L4, respectively, m1 and m3 represent the moving distances of the first lens unit L1 and the third lens unit L3 in the optical axis direction during zooming from the wide-angle end to the telephoto end, respectively.

In each of the Embodiments, the respective conditional expressions are satisfied to obtain corresponding effects. Hereinafter, the technical meanings of the respective conditional expressions will be described.

Conditional Expressions (3) and (4) are used to suitably set the refractive powers of the third lens unit L3 and the fourth lens unit L4 which are related to the magnification, thereby obtaining excellent optical performance over the entire zoom range.

When f3/fw becomes below the lower limit of Conditional Expression (3) to shorten the focal length of the third lens unit L3, it is difficult to suppress an aberration during zooming, which is caused due to an increase in refractive power. When the image stabilization performed by the third lens unit L3, the sensitivity with respect to decentering or a blurred image is increased. This is not desirable. When f3/fw exceeds the upper limit, the refractive power of the third lens unit L3 becomes smaller, and hence it is necessary to share the magnification more in the lens units other than the third lens unit L3. In order to obtain a sufficient zoom ratio, an increase in moving distance of the third lens unit L3 during zooming is required, and hence it is difficult to reduce the size of the lens system.

Conditional Expression (4) relates to the refractive power of the fourth lens unit L4 and relates to a condition for realizing excellent aberration correction over the entire zoom range as in the case of Conditional Expression (3). The refractive power of the fourth lens unit L4 is desirably within the range of Conditional Expression (4) in order to suitably obtain the sensitivity with respect to the focal plane by assigning a suitable magnification share.

Conditional Expression (4) closely relates to the moving distance of the fourth lens unit L4 during each of zooming and focusing. In the case of a high magnification, the amount of driving of the fourth lens unit L4 during focusing is large. Conditional Expression (4) also serves to suitably suppress the moving distance of the fourth lens unit L4 to avoid physical interference with adjacent lens units or glass block.

Conditional Expression (5) defines the focal length of the first lens unit L1. When f1/fw is below the lower limit of Conditional Expression (5) and thus the refractive power becomes larger, the moving distance of the first lens unit L1 during zooming becomes smaller. Therefore, an interval with the second lens unit L2 at the telephoto end narrows.

As a result, it is difficult to obtain a sufficient zoom ratio by the second lens unit L2 which is a main magnification lens unit. In addition, as the refractive power of the first lens unit L1 increases, the chromatic aberration occurs more. In order to suppress the occurrence of chromatic aberration, it is necessary to increase the number of lenses included in the first lens unit L1. This is not desirable because the size of the entire system increases.

When f1/fw exceeds the upper limit of Conditional Expression (5), the refractive power of the first lens unit L1 becomes excessively small. In order to ensure the sufficient zoom ratio, it is necessary to increase the moving distance of the first lens unit L1 during zooming. As a result, in the case of the retractable lens barrel, the structure is complicated and thus it is difficult to reduce the size of the lens barrel.

Conditional Expression (6) expresses a moving distance ratio between the first lens unit L1 and the third lens unit L3 which are moved during zooming.

The term "moving distance" here is a relative difference (distance) between lens unit positions on the optical axis at the wide-angle end and the telephoto end. When m1/m3 is below the lower limit of Conditional Expression (6), the amount of feed of the first lens unit L1 during zooming becomes smaller. Therefore, the interval with the second lens unit L2 at the telephoto end is small and thus it is difficult to obtain the sufficient zoom ratio by the second lens unit L2.

In addition, a total lens length difference between the case of the wide-angle end and the case of the telephoto end is small, an interval between the front lens (first lens unit L1) and the aperture stop SP at the wide-angle end in which a field angle is large is not sufficiently shortened, and a lens barrel diameter increases, which is not desirable.

When m1/m3 exceeds the upper limit of Conditional Expression (6), the amount of feed of the first lens unit L1 during zooming is excessively large compared with the amount of feed of the third lens unit L3. Therefore, when the lens barrel having the retractable structure is used, it is necessary to collapse the first lens unit L1 in a larger number of steps, and hence it is difficult to reduce the size of the entire system.

In each of the Embodiments, in order to perform more desirable aberration correction and to achieve a high magnification while the aberration during zooming is reduced, the numerical ranges of Conditional Expressions (3) to (6) are desirably set as follows:

$$4.2 < f3/fw < 5.0 \quad (3a);$$

$$4.6 < f4/fw < 7.0 \quad (4a);$$

$$10 < f1/fw < 20 \quad (5a); \text{ and}$$

$$1.2 < m1/m3 < 2.0 \quad (6a).$$

According to the respective Embodiments as described above, the moving distances of the respective lens units and the refractive powers of the respective lens units during zooming are suitably set, and hence the zoom lens having a short total lens length can be obtained even in the case of a high zoom ratio.

In particular, it is possible to obtain a zoom lens having excellent optical performance over the entire zoom range between the wide-angle end and the telephoto end.

Next, the lens constitution in each of the lens units is described.

The constitution of the first lens unit L1 is as follows. The first lens unit L1 has a large effective lens diameter. Therefore, small number of lenses is desirable to realize a zoom lens of small in size and of light in weight.

In each of the Embodiments, the first lens unit L1 includes: a cemented lens constituted by cementing a negative lens and a positive lens; and a positive lens. Therefore, the occurrence of spherical aberration and chromatic aberration resulting from the high zoom ratio is suppressed.

The constitution of the second lens unit L2 is as follows. In each of Embodiments 1 and 3, the second lens unit L2 includes three separate lenses, that is, a negative meniscus lens having a concave surface facing towards the image side, a negative biconcave lens, and a positive lens having an object side surface with a convex shape.

Therefore, an aberration during zooming is reduced to excellently correct, particularly, distortion at the wide-angle end and spherical aberration at the telephoto end.

In particular, in Embodiment 3, in order to obtain more excellent optical performance, an image side surface of the negative meniscus lens is formed into an aspherical shape.

Unlike Embodiments 1 and 3, in each of Embodiments 2 and 4, a negative meniscus lens having a concave surface facing towards the image side is further provided, and hence the second lens unit L2 includes the three negative lenses and the single positive lens. Specifically, the second lens unit L2 includes the two negative meniscus lenses each having the image side surface with the concave shape, the negative biconcave lens, and the positive lens having an object side surface with a convex shape.

Therefore, the occurrence of astigmatism at the wide-angle end is suppressed to facilitate a further increase in field angle at the wide-angle end.

The constitution of the third lens unit L3 is as follows. In each of the Embodiments, the third lens unit L3 includes two positive lenses and a negative lens having an image side surface with a concave shape. A principal point interval between the second lens unit L2 and the third lens unit L3 is reduced to shorten the lengths of subsequent lenses after the third lens unit L3.

The third lens unit L3 has at least one aspherical surface. Therefore, the aberration caused by zooming is excellently corrected.

In each of Embodiments 2 and 4, the cemented lens is used to suppress the chromatic aberration during zooming. The third lens unit L3 is moved so as to have a component in a direction perpendicular to the optical axis, that is, to be decentered from the optical axis, thereby minimizing the occurrence of aberration due to decentering during an image stabilization operation.

Specifically, in each of Embodiments 1 and 3, in order from the object side to the image side, the third lens unit L3 includes a positive lens having an object side surface with a convex shape, a negative meniscus lens having a concave surface facing towards the image side, and a positive lens having an object side surface with a convex shape.

In each of Embodiments 2 and 4, the third lens unit L3 includes a positive lens having an object side surface with a convex shape, a negative meniscus lens having a concave surface facing towards the image side, and a cemented lens constituted by cementing a negative meniscus lens having a concave surface facing towards the image side and a positive lens.

The constitution of the fourth lens unit L4 is as follows.

In each of the Embodiments, the fourth lens unit L4 includes a cemented lens which is constituted by cementing a positive lens having an object side surface with a convex shape and a negative lens.

With the constitution, an aberration, particularly, the chromatic aberration during focusing is reduced.

Next, Numerical Embodiments 1 to 4 respectively corresponding to Embodiments 1 to 4 of the present invention are described. In the respective numerical Embodiments, an optical surface's order counted from the object side is denoted by "i", a curvature radius of an i-th optical surface (i-th surface) is denoted by ri, an interval between the i-th surface and an (i+1)-th surface is denoted by di. In addition, a refractive index of a material of the i-th optical member based on the d-line is denoted by ndi and an Abbe number thereof based on the d-line is denoted by υdi.

Assume that eccentricity is expressed by k, aspherical coefficients are expressed by B, C, D, and E, and a displacement with respect to a surface vertex in the optical axis direction at a position corresponding to a height h from the optical axis is expressed by x. In this case, the aspherical shape is expressed by the following expression.

$$x = \frac{h^2/R}{1+\sqrt{1-(1+k)(h/R)^2}} + Bh^4 + Ch^6 + Dh^8 + Eh^{10} + A'h^3 + B'h^5 + C'h^7$$

Note that a curvature radius is denoted by R. In addition, [E-Z] indicates [$10^{-Z}$].

In the numerical Embodiments, two last surfaces are surfaces of an optical block such as a filter or a face plate.

In each of the Embodiments, a back focus (BF) is expressed as an equivalent air length corresponding to a distance between a final lens surface and a paraxial image plane. The total lens length is obtained by adding the back focus to a distance between a surface closest to the object side and the final surface.

Table 1 illustrates relationships between Conditional Expressions and various numerical values in the respective numeral Embodiments.

| Numerical Embodiment 1 | | | |
|---|---|---|---|
| Unit: mm Surface data | | | |
| Surface number | R | d | nd | vd |
| 1 | 146.716 | 2.000 | 1.80610 | 33.3 |
| 2 | 37.7078 | 5.700 | 1.49700 | 81.5 |
| 3 | −221.781 | 0.200 | 1. | |
| 4 | 38.6611 | 3.800 | 1.77250 | 49.6 |
| 5 | 182.811 | Variable | | |
| 6 | 39.9550 | 1.200 | 1.88300 | 40.8 |
| 7 | 8.3169 | 4.860 | 1. | |
| 8 | −32.7836 | 0.750 | 1.77250 | 49.6 |
| 9 | 23.8567 | 0.700 | 1. | |
| 10 | 17.5880 | 2.200 | 1.92286 | 18.9 |
| 11 | 87.0390 | Variable | | |
| 12 | (Stop) | Variable | | |
| 13* | 10.8245 | 3.000 | 1.58313 | 59.4 |
| 14 | −396.367 | 2.300 | 1. | |
| 15 | 17.1011 | 0.700 | 1.84666 | 23.9 |
| 16 | 9.2454 | 1.000 | 1. | |
| 17 | 22.2534 | 1.800 | 1.49700 | 81.5 |
| 18 | −891.992 | Variable | | |
| 19 | 29.5945 | 2.500 | 1.69680 | 55.5 |
| 20 | −26.5457 | 0.600 | 1.84666 | 23.9 |
| 21 | −70.8270 | Variable | | |
| 22 | ∞ | 1.310 | 1.49831 | 65.1 |
| 23 | ∞ | | | |

Aspherical surface data (13th surface)

k = −3.30975E−01  B = 8.42815E−05  C = 3.57003E−05
D = 4.24248E−07  E = −7.36052E−10  A' = −7.28960E−05
B' = −9.74820E−05  C' = −6.20040E−06

Various data

Zoom ratio  24.27

| | Wide angle | Intermediate | Telephoto |
|---|---|---|---|
| Focal length | 5.15 | 25.69 | 124.98 |
| F-number | 2.92 | 3.60 | 4.03 |
| Field angle | 34.7 | 7.9 | 1.63 |
| Image height | 3.56 | 3.56 | 3.56 |
| Total lens length | 97.69 | 104.30 | 115.70 |
| BF | 12.05 | 20.99 | 8.76 |
| d5 | 0.90 | 28.87 | 46.79 |
| d11 | 30.02 | 9.07 | 1.59 |

-continued

Numerical Embodiment 1

| | | | |
|---|---|---|---|
| d12 | 13.24 | 4.20 | 2.00 |
| d18 | 8.16 | 7.87 | 23.26 |
| d21 | 7.00 | 15.94 | 3.71 |

Zoom lens unit data

| Unit | First surface | Focal length |
|---|---|---|
| 1 | 1 | 64.12 |
| 2 | 6 | −10.22 |
| 3 | 13 | 23.69 |
| 4 | 19 | 33.82 |

Numerical Embodiment 2

Unit: mm
Surface data

| Surface number | r | d | nd | νd |
|---|---|---|---|---|
| 1 | 77.0564 | 1.950 | 1.80610 | 33.3 |
| 2 | 37.8403 | 6.800 | 1.49700 | 81.5 |
| 3 | 3016.789 | 0.200 | 1. | |
| 4 | 38.7115 | 4.500 | 1.60311 | 60.6 |
| 5 | 183.274 | Variable | | |
| 6 | 39.7791 | 1.000 | 1.88300 | 40.8 |
| 7 | 11.3803 | 2.100 | 1. | |
| 8 | 25.3390 | 0.850 | 1.83481 | 42.7 |
| 9 | 8.4470 | 4.000 | 1. | |
| 10 | −20.3934 | 0.800 | 1.83400 | 37.2 |
| 11 | 147.337 | 0.200 | 1. | |
| 12 | 22.4277 | 2.250 | 1.92286 | 18.9 |
| 13 | −89.4136 | Variable | | |
| 14 | (Stop) | Variable | | |
| 15* | 12.6063 | 3.000 | 1.69350 | 53.2 |
| 16 | 72.1260 | 3.000 | 1. | |
| 17 | 51.5991 | 0.900 | 1.64769 | 33.8 |
| 18 | 13.4014 | 0.500 | 1. | |
| 19 | 19.5320 | 0.700 | 2.00330 | 28.3 |
| 20 | 9.0535 | 2.150 | 1.72000 | 50.2 |
| 21 | −42.7155 | Variable | | |
| 22 | 25.9828 | 3.300 | 1.77250 | 49.6 |
| 23 | −10.3841 | 0.600 | 1.80610 | 33.3 |
| 24 | −79.5614 | Variable | | |
| 25 | ∞ | 0.800 | 1.51633 | 64.1 |
| 26 | ∞ | | | |

Aspherical surface data (15th surface)

k = 7.50153E−01　B = −9.16920E−05　C = −1.11116E−06
D = 3.51763E−08　E = −5.84379E−10

Various data

Zoom ratio　18.89

| | Wide angle | Intermediate | Telephoto |
|---|---|---|---|
| Focal length | 4.50 | 19.68 | 85.02 |
| F-number | 2.82 | 4.29 | 5.58 |
| Field angle | 40.5 | 11.1 | 2.6 |
| Image height | 3.85 | 3.85 | 3.85 |
| Total lens length | 89.86 | 101.16 | 131.43 |
| BF | 10.50 | 19.08 | 11.43 |
| d5 | 0.90 | 24.01 | 46.75 |
| d13 | 20.96 | 4.49 | 2.00 |
| d14 | 12.21 | 2.33 | 2.25 |
| d21 | 6.50 | 12.45 | 30.19 |
| d24 | 7.00 | 15.58 | 7.94 |

-continued

Numerical Embodiment 2

Zoom lens unit data

| Unit | First surface | Focal length |
|---|---|---|
| 1 | 1 | 69.46 |
| 2 | 6 | −8.90 |
| 3 | 15 | 21.40 |
| 4 | 22 | 27.66 |

Numerical Embodiment 3

Unit: mm
Surface data

| Surface number | r | d | nd | νd |
|---|---|---|---|---|
| 1 | 168.837 | 2.000 | 1.80610 | 33.3 |
| 2 | 39.7930 | 6.000 | 1.49700 | 81.5 |
| 3 | −191.074 | 0.200 | 1. | |
| 4 | 40.1495 | 3.800 | 1.77250 | 49.6 |
| 5 | 191.588 | Variable | | |
| 6 | 49.1924 | 1.200 | 1.80610 | 40.7 |
| 7* | 8.6489 | 5.155 | 1. | |
| 8 | −35.4707 | 0.750 | 1.77250 | 49.6 |
| 9 | 24.8350 | 0.700 | 1. | |
| 10 | 18.2875 | 2.200 | 1.92286 | 18.9 |
| 11 | 83.2531 | Variable | | |
| 12 | (Stop) | Variable | | |
| 13* | 10.9436 | 3.000 | 1.583126 | 59.4 |
| 14 | −126.335 | 2.300 | 1. | |
| 15 | 16.3941 | 0.700 | 1.84666 | 23.9 |
| 16 | 9.2339 | 1.000 | 1. | |
| 17 | 26.1209 | 1.800 | 1.49700 | 81.5 |
| 18 | −203.961 | Variable | | |
| 19 | 25.3089 | 2.500 | 1.69680 | 55.5 |
| 20 | −21.8784 | 0.600 | 1.84666 | 23.9 |
| 21 | −98.1680 | Variable | | |
| 22 | ∞ | 1.310 | 1.49831 | 65.1 |
| 23 | ∞ | | | |

Aspherical surface data (7th surface)

k = −2.14440E−02　B = −3.89797E−06　C = 5.39912E−08
(13th surface)
k = −4.28120E−01　B = 8.18844E−05　C = 3.49977E−05
D = 5.07879E−07　E = −7.80620E−10　A' = −7.95365E−05
B' = −9.14104E−05　C' = −6.65261E−06

Various data

Zoom ratio　19.46

| | Wide angle | Intermediate | Telephoto |
|---|---|---|---|
| Focal length | 5.15 | 22.64 | 100.24 |
| F-number | 2.80 | 3.56 | 4.00 |
| Field angle | 34.7 | 8.95 | 2.04 |
| Image height | 3.56 | 3.56 | 3.56 |
| Total lens length | 97.66 | 101.69 | 112.56 |
| BF | 10.03 | 17.33 | 8.53 |
| d5 | 0.80 | 28.00 | 47.13 |
| d11 | 26.93 | 11.43 | 1.68 |
| d12 | 17.34 | 2.81 | 2.39 |
| d13 | 8.66 | 8.22 | 18.93 |
| d19 | 7.00 | 14.30 | 5.50 |

-continued

Numerical Embodiment 3

Zoom lens unit data

| Unit | First surface | Focal length |
|---|---|---|
| 1 | 1 | 66.05 |
| 2 | 6 | −11.01 |
| 3 | 13 | 22.23 |
| 4 | 19 | 34.28 |

Numerical Embodiment 4

Unit: mm
Surface data

| Surface number | r | d | nd | νd |
|---|---|---|---|---|
| 1 | 81.5805 | 2.000 | 1.80610 | 33.3 |
| 2 | 32.0934 | 5.800 | 1.49700 | 81.5 |
| 3 | −431.793 | 0.200 | 1. | |
| 4 | 32.6655 | 4.000 | 1.69680 | 55.5 |
| 5 | 162.575 | Variable | | |
| 6 | 73.7617 | 1.000 | 1.88300 | 40.8 |
| 7 | 11.5213 | 1.900 | 1. | |
| 8 | 29.3570 | 0.850 | 1.83400 | 37.2 |
| 9 | 9.7394 | 3.300 | 1. | |
| 10 | −28.5177 | 0.800 | 1.83400 | 37.2 |
| 11 | 59.8686 | 0.200 | 1. | |
| 12 | 20.8222 | 2.250 | 1.92286 | 18.9 |
| 13 | −80.4179 | Variable | | |
| 14 | (Stop) | Variable | | |
| 15* | 11.7844 | 3.000 | 1.69350 | 53.2 |
| 16 | 2857.738 | 3.000 | 1. | |
| 17 | 58.3627 | 0.900 | 1.64769 | 33.8 |
| 18 | 13.4980 | 0.500 | 1. | |
| 19 | 32.4951 | 0.700 | 2.00330 | 28.3 |
| 20 | 8.0844 | 2.400 | 1.74400 | 44.8 |
| 21 | −48.8300 | Variable | | |
| 22 | 19.4546 | 2.700 | 1.77250 | 49.6 |
| 23 | −14.5403 | 0.600 | 1.80610 | 33.3 |
| 24 | −191.527 | Variable | | |
| 25 | ∞ | 0.800 | 1.51633 | 64.1 |
| 26 | ∞ | | | |

Aspherical surface data (15th surface)

k = 1.38974   B = −1.58071E−04   C = −2.00290E−06
D = 3.83159E−09   E = −5.84379E−10

Various data

Zoom ratio   19.42

| | Wide angle | Intermediate | Telephoto |
|---|---|---|---|
| Focal length | 5.15 | 22.36 | 100.00 |
| F-number | 2.87 | 4.11 | 5.54 |
| Field angle | 36.9 | 9.81 | 2.21 |
| Image height | 3.87 | 3.87 | 3.87 |
| Total lens length | 89.23 | 97.54 | 109.01 |
| BF | 10.75 | 16.66 | 6.76 |
| d5 | 0.90 | 21.48 | 36.18 |
| d13 | 22.75 | 7.00 | 1.75 |
| d14 | 12.22 | 2.87 | 2.00 |
| d21 | 6.50 | 13.44 | 26.21 |
| d24 | 8.00 | 13.91 | 4.01 |

-continued

Numerical Embodiment 4

Zoom lens unit data

| Unit | First surface | Focal length |
|---|---|---|
| 1 | 1 | 53.91 |
| 2 | 6 | −9.75 |
| 3 | 15 | 23.37 |
| 4 | 22 | 24.13 |

TABLE 1

| | | Embodiment | | | |
|---|---|---|---|---|---|
| Conditional Expression | | 1 | 2 | 3 | 4 |
| (1) | f2/fw | −1.98 | −1.98 | −2.14 | −1.89 |
| (2) | $1 - \beta 4t^2$ | 0.51 | 0.73 | 0.50 | 0.58 |
| (3) | f3/fw | 4.60 | 4.76 | 4.32 | 4.52 |
| (4) | f4/fw | 6.57 | 6.15 | 6.66 | 4.69 |
| (5) | f1/fw | 12.45 | 15.44 | 12.83 | 10.47 |
| (6) | m1/m3 | 1.53 | 1.69 | 1.70 | 1.26 |

Next, an embodiment of a digital still camera using the zoom lens as described in any of the Embodiments as an image taking optical system is described with reference to FIG. 9.

In FIG. 9, the digital still camera includes a camera main body 20, a photography optical system 21, a solid-state image pickup element (photoelectric transducer) 22 such as a CCD sensor or a CMOS sensor, a memory 23, and a finder 24. The photography optical system 21 has any of the zoom lenses described in Embodiments 1 to 4. The solid-state image pickup element 22 is included in the camera main body 20 and receives light of a subject image formed by the photography optical system 21. The memory 23 stores information corresponding to the subject image having subjected to photoelectric conversion by the solid-state image pickup element 22. The finder 24 includes a liquid crystal display panel and is used to observe the subject image formed on the solid-state image pickup element 22.

As described above, when the zoom lens according to the present invention is applied to an image pickup apparatus such as the digital still camera, an image pickup apparatus which is small in size and has high optical performance can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-100135, filed Apr. 8, 2008, which is hereby incorporated by reference in its entirety.

What is claimed is:

1. A zoom lens, comprising, in order from an object side to an image side:
   a first lens unit having a positive refractive power;
   a second lens unit having a negative refractive power;
   a third lens unit having a positive refractive power; and
   a fourth lens unit having a positive refractive power,
   the zoom lens performing zooming while the first lens unit, the second lens unit, the third lens unit, and the fourth lens unit are moved, wherein during zooming from a wide-angle end to a telephoto end, the first lens unit moves to be located closer to the object side at the telephoto end than at the wide-angle end and the fourth lens unit moves along a locus convex to the object side; and wherein the following conditions are satisfied:

$$-2.5 < f2/fw < -1.8; \text{ and}$$

$$0.49 < 1 - \beta 4t^2 < 0.80,$$

where f2 is a focal length of the second lens unit, fw is a focal length of the zoom lens at the wide-angle end, and β4t is an imaging magnification of the fourth lens unit at the telephoto end.

2. A zoom lens according to claim 1, wherein the following condition is satisfied $$4.0 < f3/fw < 6.0,$$

where f3 is a focal length of the third lens unit.

3. A zoom lens according to claim 1, wherein the following condition is satisfied $$4.5 < f4/fw < 8.0,$$

where f4 is a focal length of the fourth lens unit.

4. A zoom lens according to claim 1, further comprising an aperture stop moving independently from the first lens unit, the second lens unit, the third lens unit, and the fourth lens unit, which are included in the zoom lens, during zooming.

5. A zoom lens according to claim 1, wherein the following condition is satisfied $$10 < f1/fw < 25,$$

where f1 is a focal length of the first lens unit.

6. A zoom lens according to claim 1, wherein the following condition is satisfied $$1.2 < m1/m3 < 3.0,$$

where m1 and m3 are distances of movements of the first lens unit and the third lens unit, respectively, in an optical axis direction during zooming from the wide-angle end to the telephoto end.

7. A zoom lens according to claim 1, wherein the first lens unit moves along a locus convex to the image side during zooming from the wide-angle end to the telephoto end.

8. A zoom lens according to claim 1, wherein the third lens unit is moved in a direction having a component perpendicular to an optical axis to correct a position of a taken image when the zoom lens vibrates.

9. A zoom lens according to claim 1, wherein the second lens unit comprises:
 a negative meniscus lens having a concave surface facing towards the image side;
 a negative biconcave lens; and
 a positive lens having an object side surface with a convex shape.

10. A zoom lens according to claim 1, wherein the second lens unit comprises:
 a negative meniscus lens having a concave surface facing towards the image side;
 another negative meniscus lens having a concave surface facing towards the image side;
 a negative biconcave lens; and
 a positive lens having an object side surface with a convex shape.

11. A zoom lens according to claim 1, wherein the fourth lens unit comprises a cemented lens constituted by cementing a positive lens having an object side surface with a convex shape and a negative lens.

12. A zoom lens according to claim 1, wherein the third lens unit comprises, in order from the object side to the image side:
 a positive lens having an object side surface with a convex shape;
 a negative meniscus lens having a concave surface facing towards the image side; and
 a positive lens having an object side surface with a convex shape.

13. A zoom lens according to claim 1, wherein the third lens unit comprises, in order from the object side to the image side:
 a positive lens having an object side surface with a convex shape;
 a negative meniscus lens having a concave surface facing towards the image side; and
 a cemented lens constituted by cementing a negative lens having a concave surface facing towards the image side and a positive lens.

14. A zoom lens according to claim 1, wherein an image is formed on a solid-state image pickup element.

15. An image pickup apparatus, comprising:
 the zoom lens according to claim 1; and
 a solid-state image pickup element for receiving light of an image formed by the zoom lens.

* * * * *